United States Patent [19]

Piosenka et al.

[11] Patent Number: 5,777,903
[45] Date of Patent: Jul. 7, 1998

[54] SOLAR CELL POWERED SMART CARD WITH INTEGRATED DISPLAY AND INTERFACE KEYPAD

[75] Inventors: Gerald V. Piosenka, Scottsdale; Thomas M. Fox, Gilbert; Kenneth H. Schmidt, Mesa, all of Ariz.

[73] Assignee: Motorola, Inc., Schaumburg, Ill.

[21] Appl. No.: 589,684

[22] Filed: Jan. 22, 1996

[51] Int. Cl.$^6$ .................................................. G06F 7/12
[52] U.S. Cl. .................................. 364/700; 364/23
[58] Field of Search ........................ 364/700; 379/91; 380/23, 3; 235/380, 487, 454, 492, 486, 379, 441, 375

[56] References Cited

U.S. PATENT DOCUMENTS

| | | | |
|---|---|---|---|
| 4,614,861 | 9/1986 | Pavlov et al. | 235/380 |
| 4,749,982 | 6/1988 | Rikuna et al. | 340/146.2 |
| 4,795,898 | 1/1989 | Bernstein et al. | 235/487 |
| 4,806,745 | 2/1989 | Oogita | 235/492 |
| 4,812,634 | 3/1989 | Ohta et al. | 235/492 |
| 4,868,376 | 9/1989 | Lessin et al. | 235/492 |
| 4,916,296 | 4/1990 | Streck | 235/454 |
| 4,926,480 | 5/1990 | Chaum | 380/23 |
| 4,978,840 | 12/1990 | Anegawa | 235/492 |
| 5,134,434 | 7/1992 | Inoue et al. | 354/430 |
| 5,357,091 | 10/1994 | Ozawa et al. | 235/380 |
| 5,484,997 | 1/1996 | Haynes | 235/492 |
| 5,521,966 | 5/1996 | Friedes et al. | 379/91 |
| 5,532,945 | 7/1996 | Robinson | 364/707 |

FOREIGN PATENT DOCUMENTS

| | | |
|---|---|---|
| 0167044 | 6/1985 | European Pat. Off. . |
| 0237883 | 3/1987 | European Pat. Off. . |
| 0299414 | 7/1988 | European Pat. Off. . |
| 0347897 | 12/1989 | European Pat. Off. . |
| 0363871 | 4/1990 | European Pat. Off. . |
| 0498582A2 | 1/1992 | European Pat. Off. . |

OTHER PUBLICATIONS

Watahiki et al., "New Packaging Technology," IEEE/CHMT, 101–104, Jul. 1989.

An article entitled "Achieving Electronic Privacy" by David Chaum, which appeared in *Scientific American*, Copyright by Scientific American, Inc., Aug. 1992, pp. 96–101.

*Primary Examiner*—Reba I. Elmore
*Assistant Examiner*—McDievnel Marc
*Attorney, Agent, or Firm*—Bradley J. Botsch

[57] ABSTRACT

A smart card (50) transfers information between the smart card and an external system (24) while having the capability of being accessed by a user. The smart card includes a microprocessing unit (MPU) (18) for executing instructions stored in memory, a display (28), coupled to the MPU, for displaying information, a keypad (26), coupled to the MPU and to the display, for entering data by the user, an interface (54,56) for transferring signals between smart card and the external system when the smart card is coupled to the external system, and photovoltaic cells (52) for providing power to the smart card when the smart card is exposed to light. The smart card does not require the use of a bulky and inflexible battery and since the solar cells used are flexible, the flexibility of the smart card is maintained.

14 Claims, 1 Drawing Sheet

- PRIOR ART -

SOLAR CELL POWERED SMART CARD WITH INTEGRATED DISPLAY AND INTERFACE KEYPAD

BACKGROUND OF THE INVENTION

This invention relates to smart cards and, in particular, to smart cards being powered by solar cells and having integrated display and interface keypad.

A smart card is an electronic device typically including a microprocessing unit and a memory suitable for encapsulating within a small flexible plastic card, for example, one that is about the size of a credit card. The smart card additionally includes some form of an interface for communicating with an external system. Typical applications for such smart cards include the transfer of information of all types relative to banking, transportation, subscriber, health and identification.

Referring to FIG. 1, a block diagram illustrating the components comprising prior art smart card 10 is shown. Card 10 includes processor 12 being coupled to electrically erasable programmable read-only memory (EEPROM) 14, read-only memory (ROM) 15 and random access memory (RAM) 16 wherein components 12–16 may be fabricated onto a single integrated chip comprising a microprocessing/controller unit (MPU) 18, as is well known in the art wherein processor 12 executes instruction stored on ROM 15 and temporarily stores data on RAM 16 and wherein EEPROM 14 is a non-volatile memory used for storing data identifying the uniqueness of smart card 10.

Smart card 10 additionally includes input/output (I/O) signal interface 20 for transferring various I/O signals between smart card 10 and an external system 24. Interface 20 may take the form of a contact interface, which requires that smart card 10 come into contact with the external system, or a peripheral thereof, for proper transfer of signals. Alternately, interface 20 may take the form of an radio-frequency (RF) interface for allowing communication between the smart card and the external system via the transmission and reception of RF signals. External system 24 may take the form, for example, of a card reader, a merchant's point of sale system, or an automated teller machine..

Typically, the normal method of supplying power to smart card 10 is to supply power to the smart card from the external system 24 when the system communicates with smart card 10. This may be accomplished through interface 20. However, this means that smart card is only powered and its data is accessible only when smart card 10 is connected to external system 24.

However, when using a smart card not in conjunction with the external system, the user of the smart card may have a need to verify or check information on the card to insure that a particular transaction was performed correctly, or to access a current balance of an account, or other personal information stored on the card. However, the above-described smart card does not possess such a capability since it does not provide a display for viewing such information, and no power is provided to the smart unless the smart card is connected to an external system.

Accordingly, it would be desirable to provide a smart card having an integrated display, power source and an interface keypad for allowing its user to access information stored on the card while not being connected to the external system.

SUMMARY OF THE INVENTION

In accordance with the present invention, a novel photovoltaic-powered smart card for transferring information between the smart card and an external system while having the capability of being accessed by a user is disclosed. The smart card includes a microprocessing unit (MPU) for executing instructions stored in memory, a display, coupled to the MPU, for displaying information, a keypad, coupled to the MPU and to the display, for entering data by the user, an interface for transferring signals between smart card and the external system when the smart card is coupled to the external system, and photovoltaic cells for providing power to the smart card when the smart card is exposed to light. The solar-powered smart card does not require the use of a bulky and inflexible battery and since the solar cells and display used are flexible, the flexibility of the smart card is maintained.

BRIEF DESCRIPTION OF THE DRAWINGS

A more complete understanding of the present invention may be derived by referring to the detailed description and claims when considered in conjunction with the drawings, wherein like reference numbers refer to similar items throughout the drawings.

DETAILED DESCRIPTION OF THE PREFERRED EMBODIMENT

As described above, a smart card is an electronic device that is capable of storing various information for performing a wide variety of transactions, such as point-of-sale transactions. However, when the smart card is not used in conjunction with an external system, no power is supplied to the smart card and, thus, the user of the smart card has no way of accessing vital information stored therein. For example, the user may have a need to access information on the smart card to insure that a particular transaction was performed correctly by a merchant, or to access a current balance of an account, as well as other information stored on the card.

The incorporation of a battery onto a smart card would provide the proper operating potential to the processor/controller of the smart card when the user is accessing the smart card when not in connection with an external system. However, the incorporation of a battery onto a smart card has a number of disadvantages associated therewith. First, the battery typically increases the size/thickness and weight of the smart card. Second, batteries are relatively expensive and, thus, substantially increases the cost of the smart card. Third, since batteries need to be periodically replaced or re-charged, easy and convenient access to the battery must be provided for removal of the battery. This tends to increase the cost of the card as well as decrease the flexibility of the card. Fourth, the size and bulkiness of the battery decreases the flexibility of the smart card. This decrease in flexibility may cause electrical damage when the user places the smart card in a billfold for storage. Fifth, the use of a battery also requires the use of an on/off switch.

Figure 1:
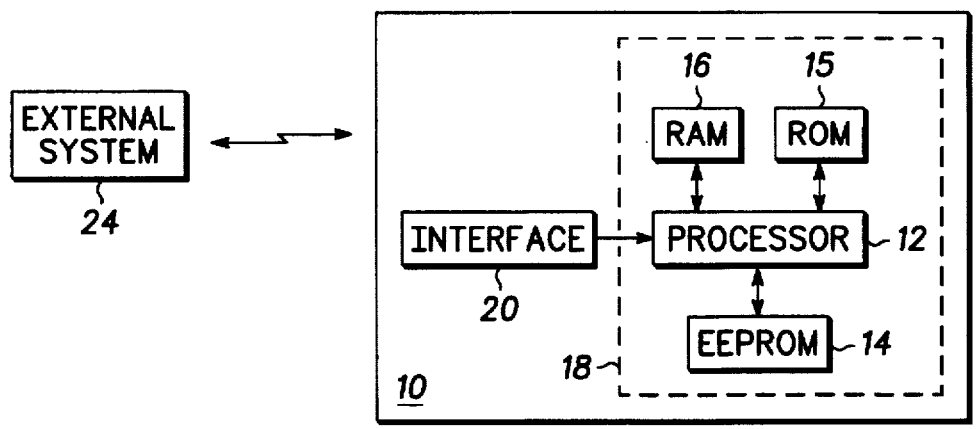
FIG. 1 is a block diagram illustrating a prior art smart card.
Figure 2:
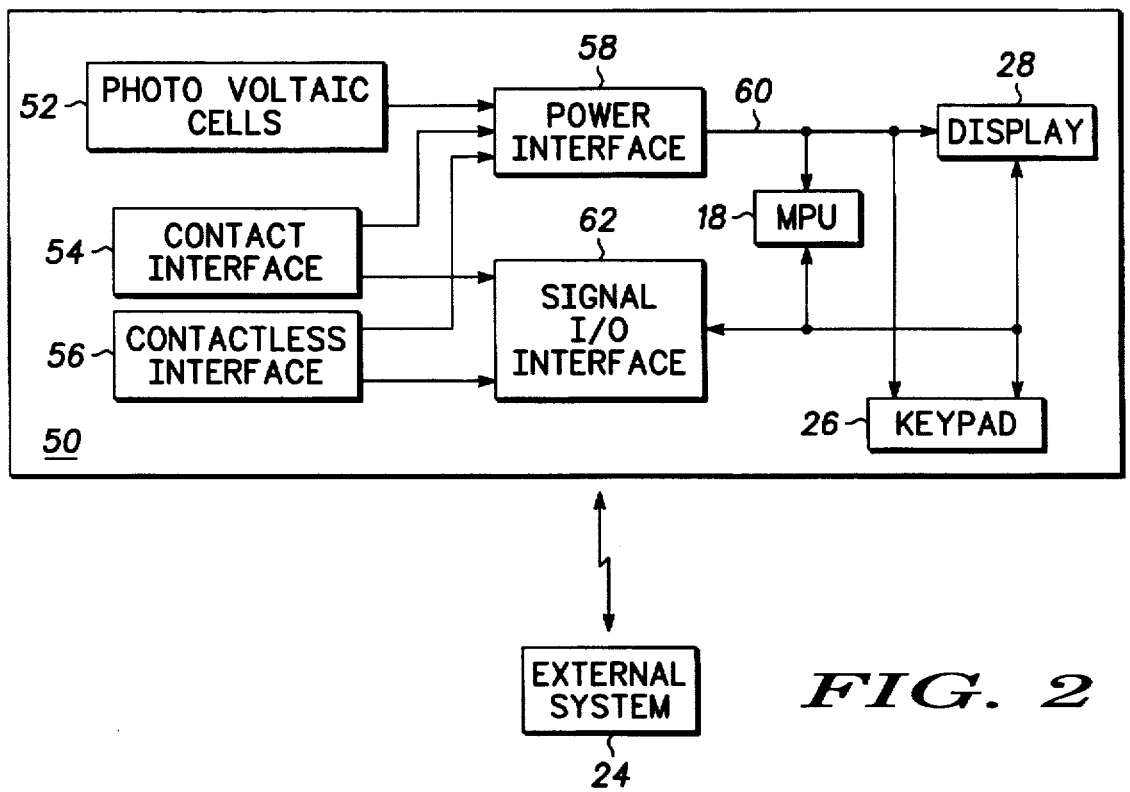
FIG. 2 is a detailed block diagram of a photovoltaic (solar) cell powered smart card having an integrated display and interface keypad in accordance with the present invention.

Referring to FIG. 2, a detailed block diagram illustrating smart card 50 is shown for verifying and/or accessing information on card 50 while not requiring connection or coupling to an external system. Smart card 50 additionally includes keypad 26 and display 28 both of which are coupled to controller or microprocessing unit (MPU) 18. Smart card 50 has the advantage of allowing the individual user of smart card 50 to conveniently access data stored within MPU 18 via keypad 26 and display 28. For example, the user may enter input data to smart card 50 via keypad 26, and data returned from smart card 50 may be viewed on display 28.

Smart card 50 additionally includes a power source that takes the form of photovoltaic cells 52 for providing power to the electronics within smart card 50. In a preferred embodiment, photovoltaic cells 52 may take the form of solar cells. Smart card 50 also includes contact interface 54 and/or contactless interface 56 and signal I/O interface 62 for independently or selectively providing communication between smart card 50 and external system 24 by either signals coming into contact with smart card 50, via contact interface 54, or by wireless signals, for example, radio-frequency (RF) signals, optical signals or capacitive or inductive coupled signals, being transmitted or received by smart card 50 via contactless interface 56.

Also, power interface 58 provides power to MPU 18, keypad 26 and display 28 via power bus 60 by selectively providing power from solar cells 52 or from external system 24 via contact interface 54 or contactless interface 56.

Solar cells 52 provide power to smart card 50 whenever smart card 50 is exposed to light. This eliminates the need for a battery and its above-mentioned disadvantages as well as the need for an on/off switch. However, since the light source may not be available when the card is inserted into, for example, a card reader, power should also be supplied via the card reader's contact or the card reader's supplied RF field for normal machine information exchanges. Accordingly, power to smart card 50 of the present invention may also be provided from an external system that communicates with smart card 50 either through contact interface 54 or contactless interface 56.

The use of solar cells 52 for powering smart card 50 maintains the flexibility of smart card 50 because solar cells 52 may take the form, for example, of flexible solar cells, or may comprise individual solar cells mounted to the core laminate of the smart card and electrically coupled by conductors, for example, copper track, in a parallel/series combination in order to obtain a desired and proper power level. Accordingly, by mounting the cells individually with separation between them, the required flexibility would be obtained. This maintains flexibility of the card so that it can be bent when in the user's billfold while still allowing the user to access information from the smart card without requiring an external battery.

Display 28 is typically a liquid crystal display (LCD). For simple smart cards, display 28 may take the form of a single character, or a small single line display, for displaying only one data item, for example, the amount left on a prepaid card. However, for more expensive and elaborate smart cards, display 28 may take the form of a multiple line alpha-numeric LCD display for executing menu driven applications between the card and the user. The flexibility of smart card 50 is maintained with the use of display 28 since display 28 may take the form of a flexible LCD or could comprise of individual LCD elements mounted to the core laminate of the card and connected by conductors to the segment drivers. Accordingly, by mounting the elements individually with separation between, the required flexibility would be obtained.

Keypad 26 of smart card 50 may require no switches for a simple readout of one data item, or may comprise one switch for allowing the user to scroll down through a fixed set of data, or may comprise an alpha-numeric keypad to allow the user to enter and retrieve data based on a menu shown on display 28.

While the invention has been described in conjunction with specific embodiments thereof, many alternatives, modifications and variations will be apparent to those of ordinary skill in the art in light of the foregoing description. For example, controller 18 may also take the form of a state machine, implemented on an application-specific integrated circuit (ASIC). Accordingly, the invention is intended to embrace all such alternatives, modifications and variations as fall within the spirit and broad scope of appended claims.

We claim:

1. A smart card for transferring information between the smart card and an external system, the smart card having the capability of being accessed by a user, the smart card comprising:

a controller unit for controlling an operation of the smart card;

a display, coupled to said controller unit, for displaying information;

a keypad, coupled to said controller unit and to said display, for entering data by the user;

an interface for transferring signals between the smart card and the external system when the smart card is coupled to the external system, wherein power may be provided to the smart card from the external system through said interface;

a power source for providing power to the smart card when the smart card is exposed to light; and a power interface for selectively powering the smart card with either power from said power source or power from the external system via said interface.

2. The smart card of claim 1 wherein said power source includes photovoltaic cells.

3. The smart card of claim 1 wherein said power source includes solar cells.

4. The smart card of claim 1 wherein said power source is comprised of flexible solar cells thereby maintaining the flexibility of the smart card.

5. The smart card of claim 1 wherein power source is comprised of a plurality of individual solar cells mounted to the smart card and electrically coupled to obtain a desired power level and wherein each of the solar cells are mounted with separation between each other thereby maintaining the flexibility of the smart card.

6. The smart card of claim 1 wherein said interface is a contact interface whereby communication of information between the smart card and the external system is accomplished by the smart card coming into contact with the external system.

7. The smart card of claim 1 wherein said interface is a contactless interface whereby communication of information between the smart card and the external system is accomplished via wireless signals.

8. The smart card of claim 1 wherein said power source is utilized when the smart card is not in connection with the external system.

9. A method for powering a smart card that has the capability of being accessed by a user when not being coupled to an external system, the smart card being utilized for transferring information between the smart card and the external system, the smart card including a controller, a display, coupled to the controller for displaying information, a keypad, coupled to the controller and to the display, for entering data by the user, and an interface for transferring signals between the smart card and the external system when the smart card is coupled to the external system wherein power may be provided to the smart card from the external system through said interface, the method comprising the steps of:

incorporating photovoltaic cells onto the smart card; and selectively powering the smart card with either power from said photovoltaic cells or power from the external system via said interface.

10. The method of claim 9 further including the step of utilizing the external system for providing power to the smart card when the smart card is coupled to the external system.

11. The method of claim 9 wherein said step of incorporating said photovoltaic cells includes the step of incorporating solar cells.

12. The method of claim 9 wherein said step of utilizing said photovoltaic cells includes the step of utilizing said photovoltaic cells when the smart card is not coupled to the external system.

13. The method according to claim 9 wherein the step of incorporating photovoltaic cells includes the steps of:

mounting a plurality of individual solar cells onto the smart card; and electrically coupling said plurality of individual solar cells together to obtain a desired power level wherein each of the solar cells are mounted with separation between each other thereby maintaining flexibility of the smart card.

14. The method according to claim 9 wherein the step of incorporating photovoltaic cells includes the step of mounting flexible solar cells onto the smart card thereby maintaining flexibility of the smart card.

* * * * *